Patented Oct. 18, 1927.

1,645,585

UNITED STATES PATENT OFFICE.

GARRETT G. BURTON, OF TOPEKA, KANSAS.

SEALING COMPOSITION FOR PUNCTURES IN PNEUMATIC TIRES AND THE LIKE.

No Drawing.  Application filed April 29, 1927. Serial No. 187,709.

My invention relates to a sealing composition for punctures in pneumatic tires and the like.

The object of my invention is to provide a seal for punctures that occur in pneumatic tires for vehicle wheels by injecting the same through the tube valve. The composition may also be applied to other compression chambers made of rubber or lined therewith, when leakage by puncture or otherwise may occur.

My composition consists of a mixture of pulverized oil cake produced from flax seed or the like as an emulsion to adhere to, or mix with the other ingredients, functioning as a conveying substance for the parts.

Amorphous sulphur and red lead are imbedded for body, strength and plasticity.

Carborundum, finely ground or pulverized, functions as a solid filler for very small punctures.

Comminuted steel wool functions as a filler for punctures of greater magnitude.

To the above parts add sufficient water, that is heated to near the boiling point, to make a semi-plastic solution so that the interior of the tube will become coated therewith. It will be understood that the semi-plastic expression means that the solution will flow, whereby the side walls of the tube will be coated and by centrifugal force that portion of the interior adjacent the tread (where punctures usually occur) will be flushed with the composition, and forced into the puncture by compressed air.

In preparing the composition I prefer to use ingredients in about the following proportions, computed by weight—viz:

| | Per cent. |
|---|---|
| Pulverized oil cake | 12 |
| Amorphous sulphur | 4 |
| Carborundum | 4 |
| Comminuted steel wool | 3 |
| Red lead | 10 |
| Water | 67 |

The amorphous sulphur and the carborundum may be omitted when a cheaper product is desired as they are associated with the red lead and comminuted steel wool, but by so doing the efficiency is somewhat impaired.

I claim:

1. In a sealing composition for punctures in pneumatic tires and the like, the combination of pulverized oil cake, amorphous sulphur, red lead, corborundum, comminuted steel wool, and water.

2. In a sealing composition for punctures in pneumatic tires and the like, pulverized oil cake 12%, amorphours sulphur 4%, red lead 10%, carborundum 4%, comminuted steel wool 3%, and water 67%.

3. In a sealing composition for punctures in pneumatic tires and the like, pulverized oil cake, red lead, comminuted steel wool, and water.

4. In a sealing composition for punctures in pneumatic tires and the like, pulverized oil cake 12%, red lead 14%, comminuted steel wool 7%, and water 67%.

In testimony whereof I affix my signature.

GARRETT G. BURTON.